United States Patent
McBride et al.

(10) Patent No.: US 7,539,565 B2
(45) Date of Patent: May 26, 2009

(54) SMART UNLOCK CONTROL BY VEHICLE LOCATION

(75) Inventors: Justin P McBride, West Bloomfield, MI (US); Thomas J Keeling, Plymouth, MI (US); Michael A Wiegand, Birmingham, MI (US)

(73) Assignee: DENSO International America, Inc., Southfield, MI (US)

( * ) Notice: Subject to any disclaimer, the term of this patent is extended or adjusted under 35 U.S.C. 154(b) by 496 days.

(21) Appl. No.: 11/362,590

(22) Filed: Feb. 24, 2006

(65) Prior Publication Data

US 2007/0203618 A1    Aug. 30, 2007

(51) Int. Cl.
G01F 7/00 (2006.01)
G01C 21/30 (2006.01)
G01C 21/00 (2006.01)

(52) U.S. Cl. .................. 701/36; 701/208; 701/213

(58) Field of Classification Search .............. None
See application file for complete search history.

(56) References Cited

U.S. PATENT DOCUMENTS

| 5,223,844 A | | 6/1993 | Mansell et al. |
| 5,247,440 A | | 9/1993 | Capurka et al. |
| 6,161,005 A | * | 12/2000 | Pinzon ................. 455/403 |
| 6,583,713 B1 | * | 6/2003 | Bates .................. 340/5.21 |
| 6,587,040 B2 | * | 7/2003 | Seto .................. 340/426.1 |
| 6,973,333 B1 | | 12/2005 | O'Neil |
| 2002/0017978 A1 | * | 2/2002 | Kanda et al. .......... 340/5.61 |

* cited by examiner

Primary Examiner—Khoi Tran
Assistant Examiner—Bhavesh Amin
(74) Attorney, Agent, or Firm—Harness, Dickey & Pierce, PLC

(57) ABSTRACT

A remote vehicle access system for a vehicle comprises a navigation module that determines a location of the vehicle. A vehicle control module receives an unlock request and one of unlocks a first door and unlocks at least the first door and a second door according to the unlock request and the location of the vehicle.

6 Claims, 6 Drawing Sheets

SMART UNLOCK CONTROL BY VEHICLE LOCATION

FIELD

The present disclosure relates to vehicle access control, and more particularly to controlling vehicle access according to vehicle location.

BACKGROUND

Conventional vehicle access technology allows a user to unlock one or more vehicle doors from a remote location. For example, a user may unlock a vehicle door using a remote access device such as a wireless key fob. A key fob is a device that includes integrated authentication mechanisms that control access to the vehicle. Alternatively, remote vehicle access control may be integrated directly on the vehicle key or with another device, such as on a mobile telephone or personal data assistant (PDA).

As shown in FIG. 1, a remote vehicle access system 10 (i.e. a remote keyless entry system) for a vehicle 12 includes a vehicle control module 14, a remote access module 16, and a remote access device 18. The remote access device 18 includes a memory 20, a control module 22, and a wireless transmitter 24. For example, the wireless transmitter 24 may transmit data according to one of a radio frequency (RF), infra red (IR), and Bluetooth (BT) wireless protocol.

The remote access device 18 transmits data to the remote access module 16. The control module 22 communicates with the memory 20 and the wireless transmitter 24. The control module 22 directs the wireless transmitter 24 to transmit data to the remote access module 16 according to authentication information stored in the memory 20 and in response to input at a user interface 26. The user interface 26 includes one or more buttons 28-1 and 28-2, referred to collectively as buttons 28. A user presses one of the buttons 28 to one of lock and unlock one or more doors of the vehicle 12.

The wireless transmitter 24 transmits data 30 indicative of a lock or unlock request to the remote access module 16. The remote access module 16 includes a wireless receiver 32 that receives the data 30. The remote access module 16 communicates with the vehicle control module 14 via a vehicle data bus 34. The vehicle control module 14 receives the data 30 and locks or unlocks the vehicle doors accordingly.

The remote vehicle access system 10 may include one or more security features. For example, the remote vehicle access system 10 may unlock a first vehicle door when one of the buttons 28 is pressed a first instance. The remote vehicle access system 10 unlocks all of the vehicle doors when the button 28 is pressed a second instance within a period of the first instance. In this manner, a user may request that only a driver-side door is unlocked.

SUMMARY

A remote vehicle access system for a vehicle comprises a navigation module that determines a location of the vehicle. A vehicle control module receives an unlock request and one of unlocks a first door and unlocks at least the first door and a second door according to the unlock request and the location of the vehicle.

In other features, a location-specific control system for a vehicle comprises a navigation module that determines a location of the vehicle. A memory stores programmed vehicle locations. A control module communicates with the navigation module and the memory, receives the location of the vehicle, determines whether the location matches one of the programmed vehicle locations stored in the memory, determines at least one function that is associated with the one of the programmed vehicle locations, and performs the at least one function when the location of the vehicle matches the one of the programmed vehicle locations.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1:
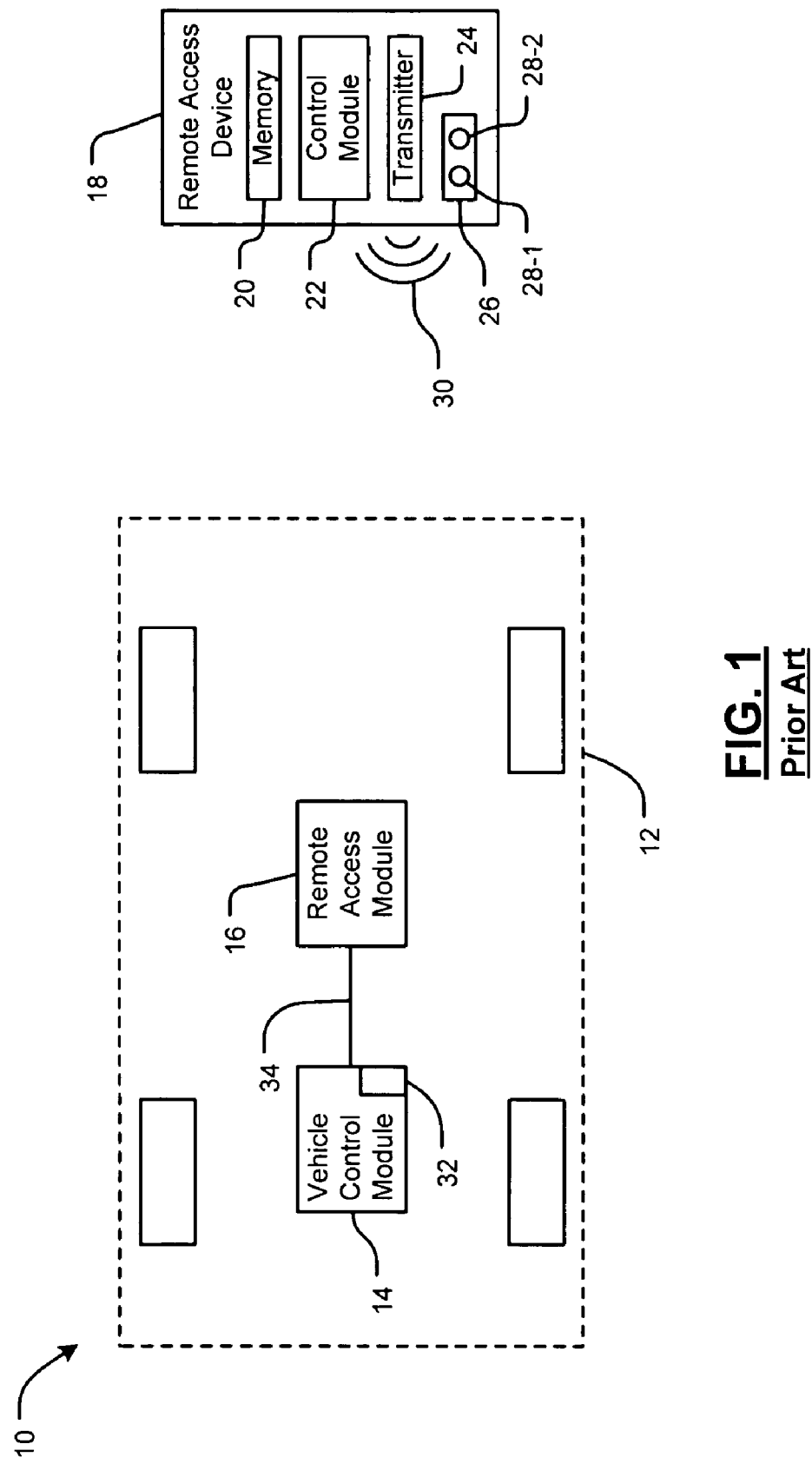
FIG. 1 is a functional block diagram of a remote vehicle access system according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
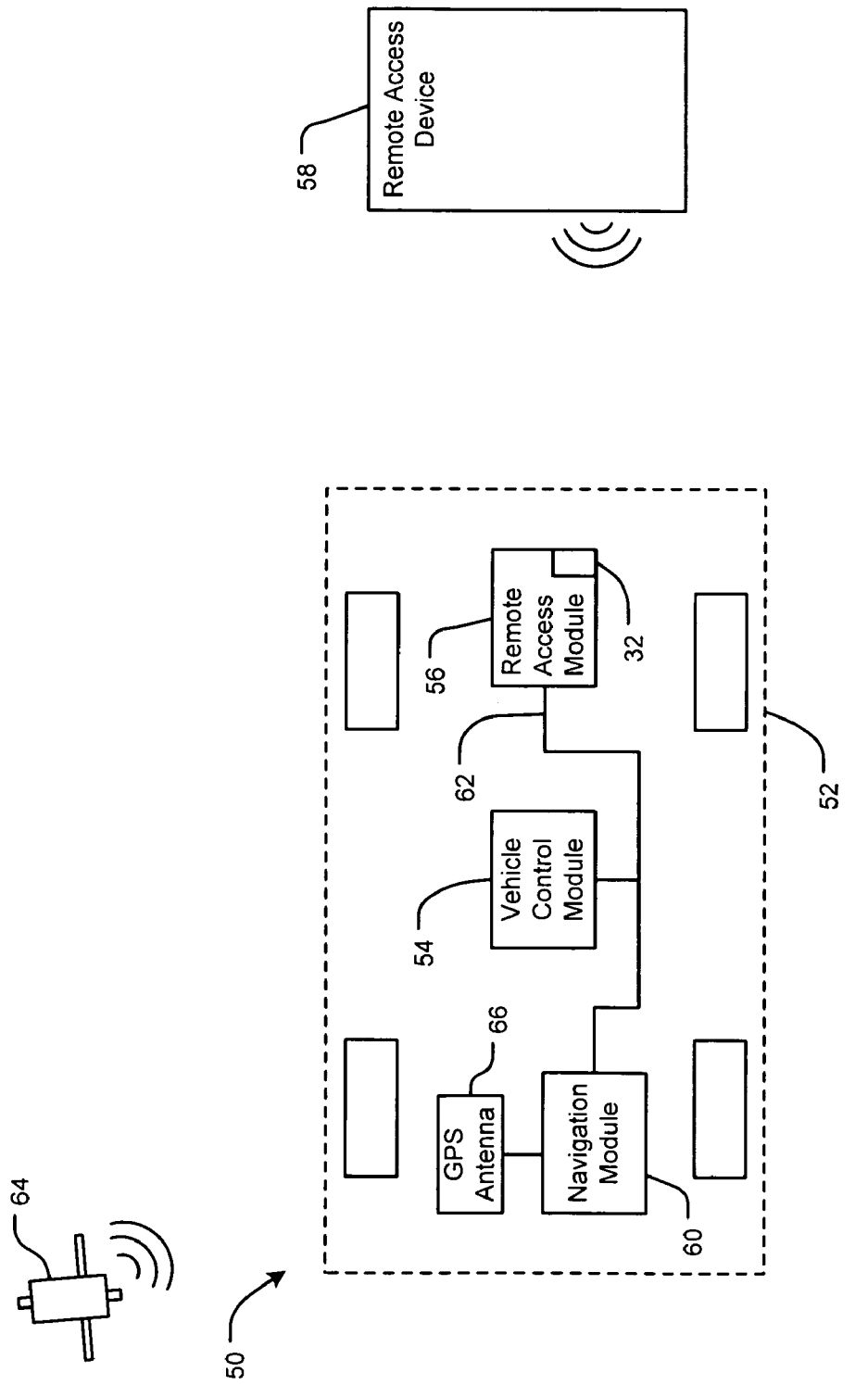
FIG. 2 is a functional block diagram of a remote vehicle access system according to the present invention.

Referring now to FIG. 2, a location-specific remote vehicle access system 50 for a vehicle 52 includes a vehicle control module 54, a remote access module 56, a location-specific remote access device 58, and a navigation module 60. For example, the navigation module 60 is a Global Positioning System (GPS) module. The vehicle control module 54 communicates with the remote access module 56 and the navigation module 60 via a vehicle data bus 62. Alternatively, at least one of the remote access module 56 and the navigation module 60 may be integrated with the vehicle control module 54.

The navigation module 60 wirelessly communicates with a GPS satellite 64 via a GPS antenna 66. The navigation module 60 determines a location of the vehicle 52 according to data received from the GPS satellite 64. The vehicle control module 54 one of locks and unlocks doors of the vehicle 52 according to the location of the vehicle 52 and data received from the remote access module 56 (i.e. data transmitted by the remote access device 58). In this manner, the location-specific remote vehicle access system 50 is responsive to the location of the vehicle 52. For example, a single button press may unlock only a driver-side door when the vehicle 52 is in a first location. Conversely, a single button press may unlock all of the doors when the vehicle 52 is in a second location.

Figure 3:
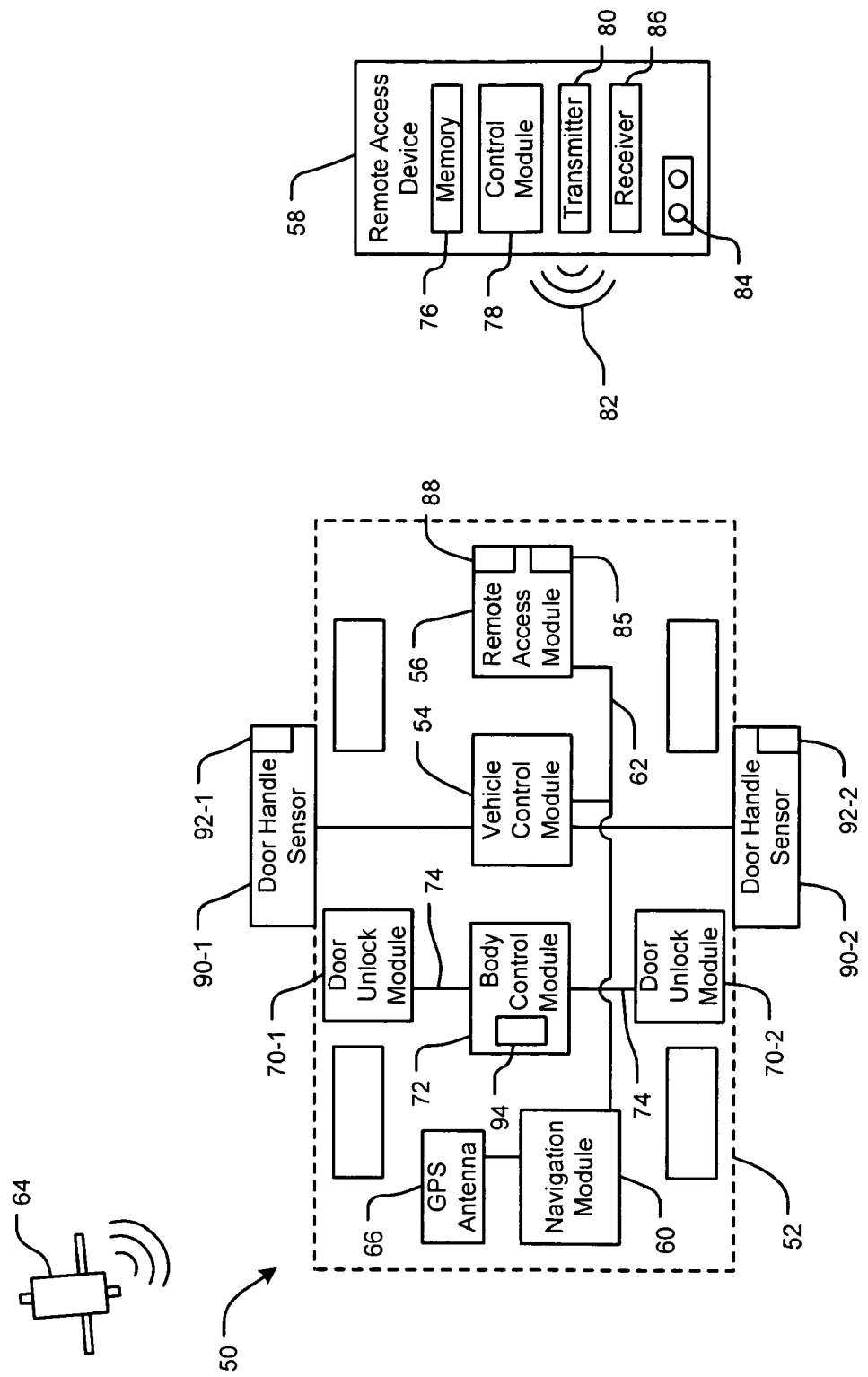
FIG. 3 is functional block diagram of a second implementation of a remote vehicle access system according to the present invention.

Referring now to FIG. 3, the location-specific remote vehicle access system 50 is shown in more detail. The vehicle 52 further includes door unlock modules 70-1 and 70-2 (referred to collectively as door unlock modules 70) and a body control module 72. The body control module 72 communicates with the vehicle control module 54 and the navigation module 60 via the vehicle data bus 62. The door unlock modules 70 include door motors or actuators (not shown) that one of lock and unlock doors of the vehicle 52 in response to a lock/unlock signal 74 from the body control module 72. The remote access module 56, the navigation module 60, and/or body control module 72 may be integrated with (i.e. included in) the vehicle control module 54.

The location-specific remote access device 58 includes a memory 76, a control module 78, and a wireless transmitter 80. The wireless transmitter 80 transmits data 82 to the vehicle 52 according to user interaction with buttons 84. The wireless receiver 85 of the remote access module 56 receives the data 82 from the wireless transmitter 80. The vehicle control module 54 generates lock/unlock signals according to the data 82.

Alternatively or additionally, the remote access device 58 includes a wireless receiver 86 and the remote access module 56 includes a wireless transmitter 88. The remote access module 56 transmits authentication request data to the remote access device 58. For example, the authentication request data may include an encoded request for verification. The remote access device 58 receives the authentication request. The control module 78 decodes the authentication request and the remote access device 58 transmits an authentication response to the remote access module 56. The authentication response verifies that the remote access device 58 is the appropriate device. In other words, the authentication response verifies that the user of the remote access device 58 is the owner and/or driver of the vehicle 52.

The remote vehicle access system 50 may include door handle touch or proximity sensors 90-1 and 90-2 (referred to collectively as door handle sensors 90) and antennas such as low frequency (LF) antennas 92-1 and 92-1 (referred to collectively as antennas 92). The antennas 92 may continuously or periodically transmit the authentication request data. When the remote access device 58 is within a threshold distance of one of the antennas 92, the remote access device 58 receives the authentication request data and automatically transmits the corresponding authentication response. When the user touches the door handle, the door handle sensor 90-1 transmits an unlock signal to the vehicle control module 54. Alternatively, the door handle sensor 90-1 may transmit the unlock signal when the remote access device 58 is within a threshold distance of the vehicle 52. In other words, the vehicle control module 54 can generate the lock/unlock signals according to the data 82 and/or the unlock signals from the door handle sensors 90.

The body control module 72 receives the lock/unlock signals from the vehicle control module 54 via the vehicle data bus 62. The body control module 72 receives location control data from the navigation module 60 via the vehicle data bus 62. The navigation module 60 generates the location control data according to a location of the vehicle 52. The body control module 72 locks or unlocks the doors of the vehicle 52 according to the lock/unlock signals and the location of the vehicle. For example, when the body control module 72 receives an unlock signal and a first location, the body control module 72 unlocks only a driver-side door. When the body control module 72 receives an unlock signal and a second location, the body control module 72 unlocks all vehicle doors.

Those skilled in the art can appreciate that other implementations are possible. For example, the vehicle control module 54 receives the location control data and generates an unlock signal that is indicative of a location of the vehicle 52. When the vehicle 52 is in a first location, the vehicle control module 54 transmits a signal to direct the body control module 72 to unlock only the driver-side door. When the vehicle 52 is in a second location, the vehicle control module 54 transmits a signal to direct the body control module 72 to unlock all vehicle doors.

The body control module 72 may include a programmable memory 94. The memory 94 stores programmed location data and associates the location data with various lock/unlock operations. For example, the body control module 72 may compare the location control data received from the navigation module 60 with the programmed location data. When the location control data matches the programmed location data, the body control module 72 unlocks all vehicle doors. When the location control data does not match the programmed location data, the body control module 72 unlocks only the driver-side door. Alternatively, the programmable memory 94 may be located in the vehicle control module 54 and/or the navigation module 60.

The user may program the programmable memory 94. The user may input specific locations and/or functions into the memory 94. In the specific locations, the body control module 72 unlocks all vehicle doors. For example, the user may input GPS specific data, zip codes, street addresses, cities, and/or other location-specific data into the memory 94. The user may also program specific functions to associate with the locations in the memory 94. For example, the user may program the memory 94 to continuously maintain all vehicle doors in an unlocked state when the vehicle 52 is at a residence (e.g. in a garage) of the user. The user may program the memory 94 to automatically lock and/or unlock specific doors of the vehicle 52 in specific locations.

Figure 4B:
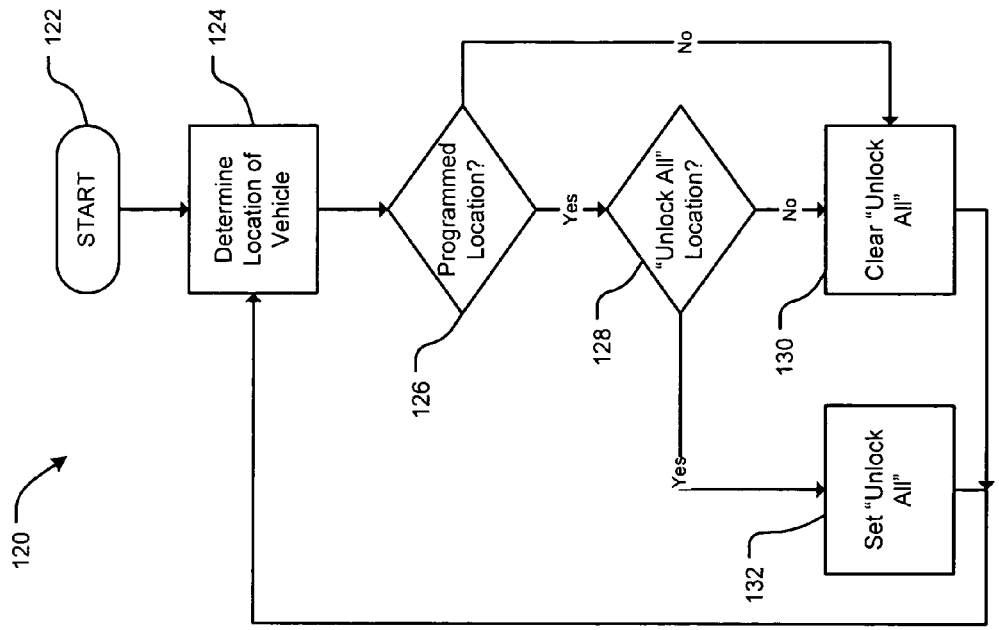
FIG. 4B is a flow diagram illustrating steps of a programmable location method according to the present invention.
Figure 4A:
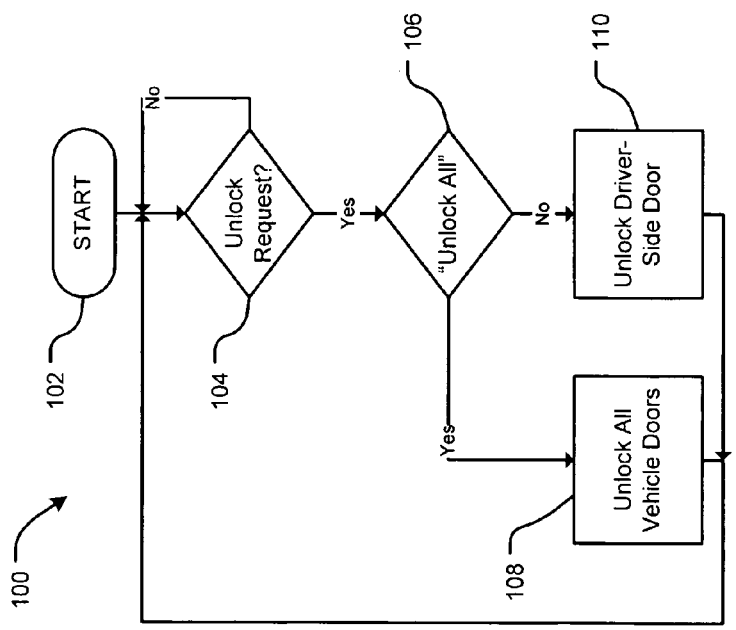
FIG. 4A is a flow diagram illustrating steps of a remote vehicle access method according to the present invention.

Referring now to FIG. 4A, a remote vehicle access method 100 begins in step 102. In step 104, the remote vehicle access system 50 determines whether the vehicle 52 has received an unlock request (e.g. received an unlock request from the remote access device 58 or the door handle sensors 90). If true, the method 100 continues to step 106. If false, the method 100 repeats step 104. In other words, the method 100 continuously monitors the remote vehicle access system 50 to check for unlock requests.

In step 106, the method 100 determines whether the location of the vehicle 52 is an "unlock all" location. For example, the method 100 may check whether an "unlock all" status bit is set. If true, the method 100 continues to step 108. If false, the method 100 continues to step 110. In step 108, the method 100 unlocks all vehicle doors. In step 110, the method unlocks only the driver-side door.

Referring now to FIG. 4B, a programmable location method 120 begins in step 122. In step 124, the method 120 determines a location of the vehicle 52. In step 126, the method 100 determines whether the location of the vehicle 52 is a programmed location (i.e. location programmed into the memory 94). If true, the method 120 continues to step 128. If false, the method continues to step 130. In step 128, the method 120 determines the whether the programmed location is an "unlock all" location. If true, the method 120 continues to step 132. If false, the method 120 continues to step 130. In step 130, the method 120 clears an "unlock all" status. For example, the method 120 may clear the "unlock all" status bit. In step 132, the method 120 sets the "unlock all" status bit.

Figure 5:
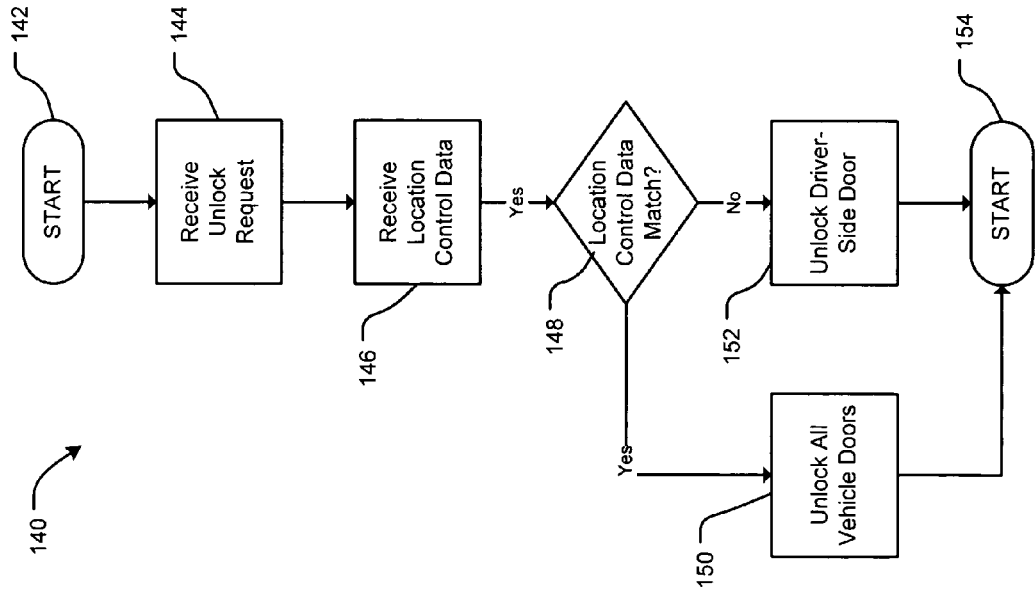
FIG. 5 is a flow diagram illustrating steps of a second implementation of a remote vehicle access method according to the present invention.

Referring now to FIG. 5, a second implementation of a remote access method 140 begins in step 142. In step 144, the method 140 receives an unlock request. In step 146, the method 140 receives location control data. In step 148, the method 140 determines whether the location control data matches a programmed location. If true, the method 140 continues to step 150. If false, the method 140 continues to step 152. In step 150, the method 140 unlocks all vehicle doors. In step 152, the method 140 unlocks only the driver-side door. The method 140 ends in step 154.

Figure 6:
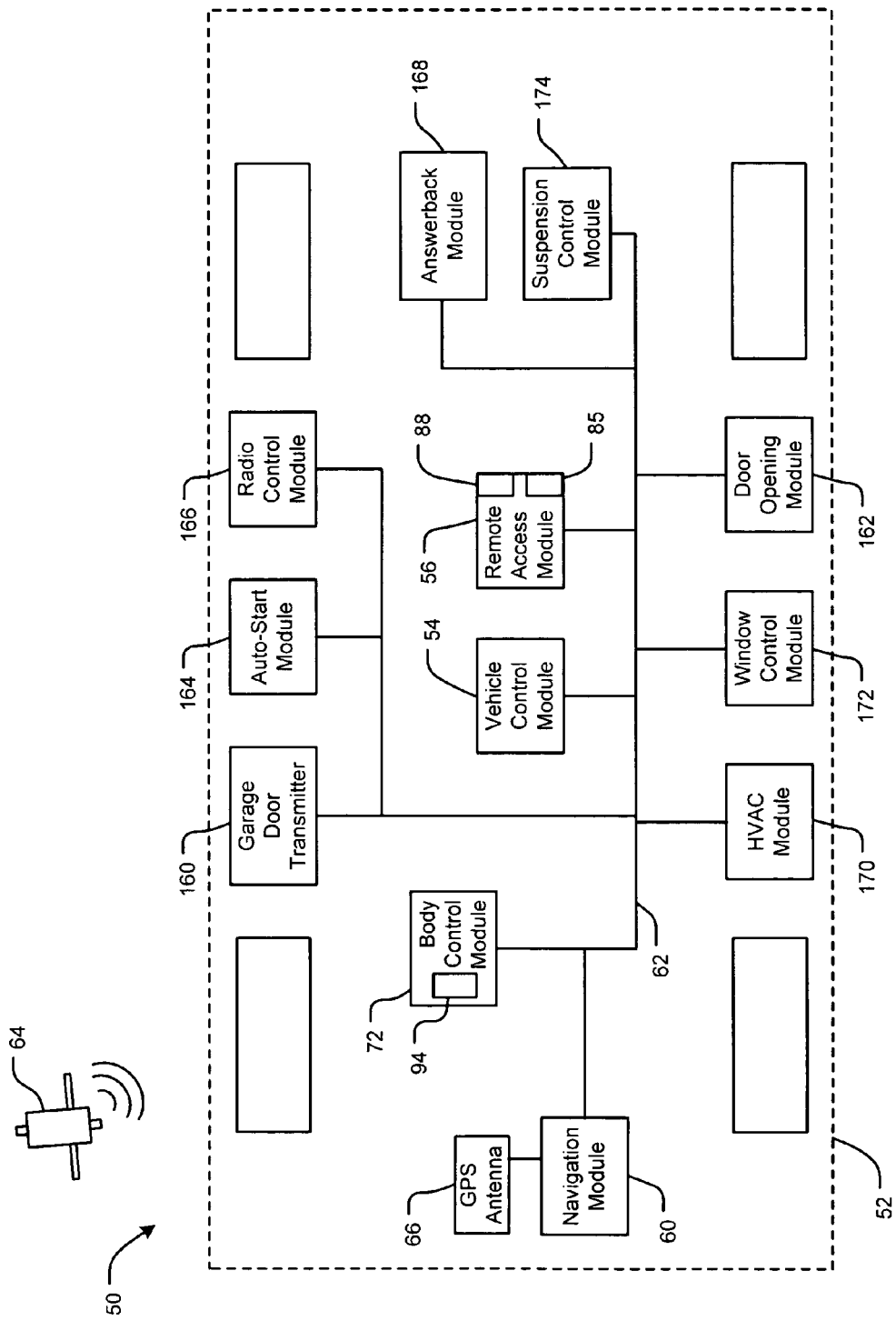
FIG. 6 is a functional block diagram of third implementation of a remote vehicle access system according to the present invention.

Referring now to FIG. 6, the remote vehicle access system 50 may include other location-specific control modules. The remote vehicle access system 50 may include a garage door transmitter 160, a vehicle door opening module 162, an engine auto-start module 164, a radio control module 166, an answerback module 168, a heating, ventilation, and cooling (HVAC) module 170, a window control module 172, and/or a suspension control module 174. The user may program the memory 94 to associate any of the functions of the above-identified modules with specific locations. For example, the user may program the location within a vicinity of the user's residence with garage door control functions. When the vehicle 52 approaches the residence, the garage door transmitter 160 automatically transmits a signal to open the garage door. Conversely, the transmitter 160 automatically transmits a signal to close the garage door when the vehicle 52 leaves the garage.

Similarly, the user may program locations for vehicle (or trunk) doors to automatically open or for vehicle auto-start. For example, the user may program the remote vehicle access system 50 to automatically unlock doors and start the engine only when at the user's residence or place of employment. The user may program the door opening module 162 to automatically open vehicle doors when the vehicle 52 is at a commercial supermarket or to automatically open a fuel door when the vehicle 52 is at a service station.

The answerback module 168 communicates with an audio output device such as a horn (not shown) of the vehicle 52. Typically, the answerback module 168 audibly indicates (i.e. "answers back") when a user presses a button on the remote access device 58. In the present invention, the user may program the remote vehicle access system 50 to omit or lower the volume of the answer back in specific locations.

The radio control module 166 includes radio station preset data. The user may program the radio station preset data to correspond to specific locations. For example, in a first location, a first set of station presets is used. In a second location, a second set of station presets is used.

The HVAC module 170 may include climate control data. The user may program the climate control data to correspond to specific locations. For example, the user may program the climate control data to maintain a first temperature and humidity level in a first location and a second temperature and humidity level in a second location.

The window control module 172 one of opens and closes windows of the vehicle 52. The user may associate specific locations with functions of the vehicle control module 172. For example, the user may program the window control module 172 to automatically open the windows when the user approaches the vehicle 52 in certain locations. Conversely, the user may program the window control module 172 to automatically close when the vehicle 52 is in other locations.

The suspension control module 174 includes suspension control data. The user may program the suspension control data to correspond to specific locations (e.g. specific roads). For example, the user may program the suspension control module 174 to operate according to a first set of suspension control data on unpaved roads and according to a second set of suspension control data on paved roads.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A remote vehicle access system for a vehicle, comprising:
   a navigation module that determines a vehicle location using a Global Positioning System;
   a memory that stores programmed geographic locations;
   a vehicle control module that receives the vehicle location from the navigation module and that receives an unlock request from at least one of a remote access device and a door handle touch sensor and determines whether the vehicle location matches one of the programmed geographic locations; and
   a body control module that unlocks a first door as a direct result, when the geographic location is automatically determined that said location, does not match one of the programmed locations.

2. The remote vehicle access system of claim 1 wherein the vehicle control module receives the unlock request, determines whether the location matches one of the programmed locations, and unlocks at least the first door and a second door when the location matches one of the programmed locations.

3. The remote vehicle access system of claim 1 wherein the vehicle control module unlocks at least the first door and the second door when the vehicle is at a second location.

4. A remote vehicle access method for a vehicle, comprising:
   storing programmed vehicle locations in a memory;
   determining a vehicle location using a Global Positioning System and receiving the location in a vehicle control module;
   receiving an unlock request in the vehicle control module from at least one of a remote access device and a door handle touch sensor;
   determining automatically whether the vehicle location matches one of the programmed vehicle locations in memory; and
   unlocking a first door as a direct result, when the vehicle location does not match one of the programmed vehicle locations.

5. The remote vehicle access method of claim 4 further comprising:
   unlocking at least the first door and a second door when the location matches one of the programmed locations.

6. The remote vehicle access method of claim 5 further comprising:
   unlocking at least the first door and the second door when the vehicle is at a second location.

* * * * *